P. J. & M. M. LEY.
Harvester-Rakes.
No. 151,891. Patented June 9, 1874.
Fig. 1.
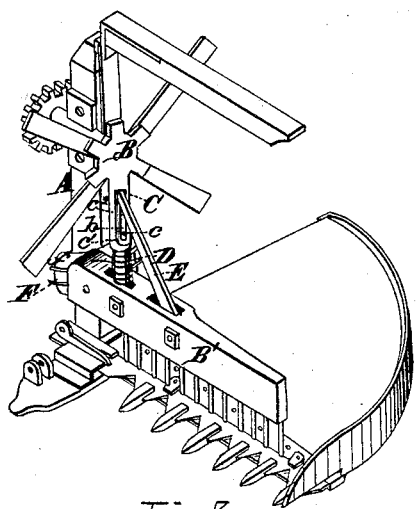
Fig. 2. Fig. 3.
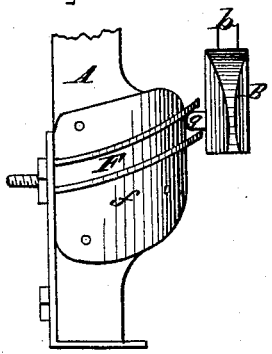
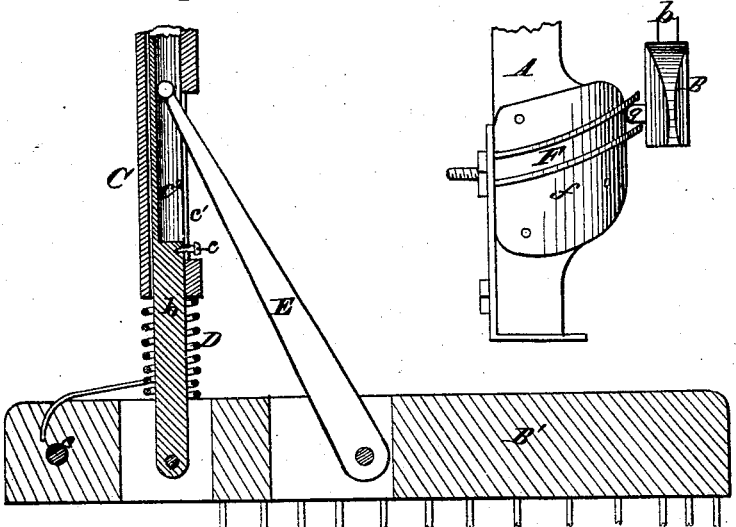
WITNESSES: Jas. E. Hutchinson
J. W. Mister
INVENTORS
Phillip J. Ley
Martin M. Ley
Edson Brothers
Attys

UNITED STATES PATENT OFFICE.

PHILLIP J. LEY AND MARTIAN M. LEY, OF DELPHOS, OHIO.

IMPROVEMENT IN HARVESTER-RAKES.

Specification forming part of Letters Patent No. 151,891, dated June 9, 1874; application filed April 2, 1874.

*To all whom it may concern:*

Be it known that we, PHILLIP J. LEY and MARTIAN MARCELLES LEY, of Delphos, in the county of Allen and State of Ohio, have invented a certain new and useful Improvement in Harvester-Rakes, of which the following is a full, clear, and exact description, reference being had to the annexed drawing, in which—

Figure 1 is a perspective view of our improved harvester-rake; and Fig. 2 is an enlarged detached view of the same.

Like parts of the two figures are indicated by like letters.

This invention relates to a certain improvement in harvester-rakes; and it consists of a rake pivoted to an independently horizontally-revolving bar attached to one of the reel-arms, and acted upon by a spring for returning it to its original position after being freed from the reel-post, or after delivering the gavels from the platform, the inner or heel end of said rake, or a projection thereon, entering and passing within a cam-groove on the reel-post, by which the said rake is caused to have an independent, vertical, and horizontal movement, to remove and deliver the gavel from and to one side of the platform.

In the annexed drawing, A refers to the reel-post, rigidly secured in any known way upon an extension of the platform, and to one side and in rear of the cutter-bar. B is the reel, which is suitably journaled upon the reel-post A, the free end of whose shaft or axis is provided with a toothed wheel, around which and a similar wheel, attached to the axis of the transporting-wheels of the harvester may be passed an endless chain for transmitting motion to the reel. B' is the rake, which is pivoted at its inner end to a revolving bar, $b$, fitting in or surrounding the cylindrical reel-arm C. The bar $b$ is held in the said arm, and limited in its movement by a screw or projection, $c$, extending through and resting in the lower end of a slot or opening, $c^1$, made in the said arm. A spring, D, secured respectively to the reel-arm C and the rake B', is used to return the latter to its former or original position after it has been freed from the cam-groove on the reel-post, or after it has delivered the gavel from the platform.

E is a brace pivoted to the rake, and passing up through the opening $c^1$ in the reel-arm C, and entering and sliding within a second opening or slot, $c^2$, in the bar $b$, in which its inner end is confined by lugs or shoulders bearing against the walls of the slot, to permit it to adapt itself to the independent vertical movement of the rake. F is a cam-groove, which is made either directly in the reel-post or formed upon or made in a plate, $f$, fastened to such reel-post. This groove starts from one side of the post A, and is then curved upward and around the front and opposite side, and to the rear of the said post, as seen in the drawing.

It will be observed that as the pin $g$ on the rear side of the inner end of the rake B' enters and passes within the cam-groove F, the said rake will be depressed or inclined downward toward its outer end, by which its teeth will be made to approach and enter the cut grain on the platform, and that simultaneously with such depression of the rake an independent horizontal movement, partaking of the form of the arc of a circle, will be imparted to the rake, to cause it to deliver the gavel from and to one side of the platform.

The pin $g$ can be dispensed with, and the heel or inner end of the rake made to enter and pass within the cam-groove F by making them to correspond in width, or the groove of such a size as to receive such end of the rake.

Having thus described our invention, what we claim, and desire to secure by Letters Patent, is—

1. The cam-groove F in the reel-post, in combination with the rake B', revolving bar $b$ of the reel, and spring D, substantially as and for the purpose set forth.

2. The bar $b$ of the rake, screw $c$, and sliding brace E, in combination with the reel-arm C and rake B', substantially as and for the purpose set forth.

In testimony whereof we have hereunto signed our names in presence of two subscribing witnesses.

PHILLIP JAMES LEY.
MARTIAN MARCELLES LEY.

Witnesses:
HORACE BIXLY,
WM. RIGDON.